United States Patent [19]
Finkelstein et al.

[11] Patent Number: 5,383,175
[45] Date of Patent: Jan. 17, 1995

[54] LASER POWER CONTROL WITH DEFOCUSING OFFSET DURING DATA RECORDING

[75] Inventors: Blair I. Finkelstein; David E. Call, both of Tucson, Ariz.

[73] Assignee: International Business Machines Corporation, Armonk, N.Y.

[21] Appl. No.: 992,525

[22] Filed: Dec. 17, 1992

[51] Int. Cl.[6] ............................................. G11B 7/00
[52] U.S. Cl. ..................................... 369/121; 369/116; 369/107
[58] Field of Search ............ 369/121, 116, 100, 44.11, 369/288, 44.12, 44.27, 107

[56] References Cited

U.S. PATENT DOCUMENTS

| | | | |
|---|---|---|---|
| 3,736,046 | 5/1973 | Zook | 369/100 |
| 3,975,630 | 8/1976 | Zorn | 369/44.23 |
| 4,639,907 | 1/1987 | Aoki et al. | 369/100 |
| 4,785,443 | 11/1988 | Minami et al. | 369/116 |
| 4,815,058 | 3/1989 | Nakamura et al. | 369/44.23 |
| 4,858,219 | 8/1989 | Yoshikawa | 369/116 |
| 4,868,804 | 9/1989 | Le Carvennec et al. | 369/100 |
| 4,949,329 | 8/1990 | Furman et al. | 369/116 |
| 5,136,569 | 8/1992 | Fennema et al. | 369/44.27 |
| 5,216,659 | 6/1993 | Call et al. | 369/116 |
| 5,268,893 | 12/1993 | Call et al. | 369/116 |

Primary Examiner—Paul M. Dzierzynski
Assistant Examiner—Kim-Kwok Chu
Attorney, Agent, or Firm—Greenlee and Winner

[57] ABSTRACT

A laser control system for use with an erasable optical disk device to minimize laser feedback during a recording operation. Focus control circuits are utilized to establish a slightly defocused condition prior to a recording operation and maintaining that slightly defocused condition throughout the recording operation. Defocusing the write beam significantly reduces feedback and thereby significantly increases pulse-to-pulse repeatability of the write pulse amplitude at the optical disk.

7 Claims, 3 Drawing Sheets

LASER POWER CONTROL WITH DEFOCUSING OFFSET DURING DATA RECORDING

This invention relates to optical disk devices and, more particularly, relates to reducing the effect of laser feedback when writing data to magneto-optic media.

BACKGROUND OF THE INVENTION

Optical disk devices utilize laser light for recording data onto and sensing data from storage media. These devices are often used for the storage of computer-prepared data and have recognized value in their ability to store large quantities of data. The media for use in such devices is reactive to light and is heated thereby to levels which enable the recording of data. To write data on optical media, a laser beam is focussed onto the media surface and the laser is operated at a relatively high power level in order to alter the media in accordance with an input data stream. In reading data back, the laser power level is controlled to a lower level so that the media is not altered by the laser beam, but the reflected light indicates the presence or absence of media alterations.

Optical media is of three general types, media which can be written only once, media which can be written, erased and written again and media which is read only such as CD-ROM. This invention relates to systems which employ erasable media such as magneto-optic (MO) media. Such media is not permanently altered when the data is written. In MO media, the magnetic orientation of the reactive material is altered in the writing process, and in the erasing process, the magnetic orientation is reordered.

In operating an optical disk system, it is necessary to set the correct laser power level to read and to write for each optical disk. The correct parameters for the optical disk are included in information in an identification header written onto the disk itself. That information, when read by the system, enables a calibration circuit to set the desired current levels for the laser to produce correct laser power. Since, however, the laser is subject to unintended changes in its operating parameters, particularly with temperature and aging, a calibration system is also used to change current levels for the laser so that the correct power level is maintained under operating conditions and throughout laser life.

The common practice of calibrating laser circuits to operate with a given optical medium usually involves analyzing the laser light intensity at the optical medium at the time the optical disk device is manufactured. To perform the analysis, laser control circuits are set to match a predetermined desired light intensity at the optical medium. Analysis is conducted to establish data for entry into the device memory. That data is used by the device processor to enable setting digital to analog converters (DACs) which control laser power in the writing and erasing operations. Read power levels and the power level to write "zero" digits, called a baseline level, are also established under control of the device processor. In a typical optical disk device, the baseline level for data recording may be 0.5 milliwatts, while the instantaneous write power level may be established at 5 to 20 milliwatts during the time space for a single write event, that is, the time needed to write a single mark on the media. The laser may be rapidly switched from the higher level to the baseline level several times during a single write event. It is not unusual to write with several short high-power pulses interspersed with longer periods at the baseline level.

In a typical optical device, the read power level may be set at 2 milliwatts, while the erase power level, during which the light source operates continuously, may be set at 8 milliwatts.

Semiconductor diode lasers are presently the light source of preference in optical disk systems. They are light weight, efficient in electrical-to-optical power conversion, and can be intensity modulated by control of the injection current. Because of losses in beam collimating, circularizing and focusing elements, the optical path efficiency for coupling the generated light to the disk, is about 50%. Thus, the power requirements of the light source are twice those required at the disk and 50 milliwatt diode lasers are typically employed.

The stability of the laser emission is a major factor in determining the signal-to-noise ratio for data retrieval. Diode lasers are subject to mode hops between Fabry-Perot cavity resonances and are therefore subject to an inherent instability. In addition, light reflected from the optical disk directly back to the laser greatly increases laser instability. In magneto-optic (MO) systems, such feedback cannot be eliminated with passive optical components because the signal is detected as elliptical polarization produced at the disk surface by Kerr rotation of incident linearly polarized light. However, increasing the power level at which the laser operates to 15–20 milliwatt pulses, significantly reduces its sensitivity to feedback. Nevertheless, the pulse-to-pulse repeatability of write power levels is of concern, and is one of the major causes of failure to record data properly during a write event.

SUMMARY OF THE INVENTION

Briefly stated, this invention provides a laser control system for use in an optical disk device to minimize laser feedback during data recording. The system provides focus control circuits to retain the laser in focus despite small variations in optical path length which occur as an optical disk rotates. The focus control circuit is utilized in this invention to establish focus control at a slightly defocused level. Defocusing the write beam significantly decreases feedback, and therefore, greatly increases pulse-to-pulse repeatability of write pulse amplitude at the optical disk. Defocusing the beam increases the required power to write the disk a marginal amount. To compensate for the increase in power, the same level of defocus used for writing the disk is also used during write power calibration.

DETAILED DESCRIPTION

Figure 1:
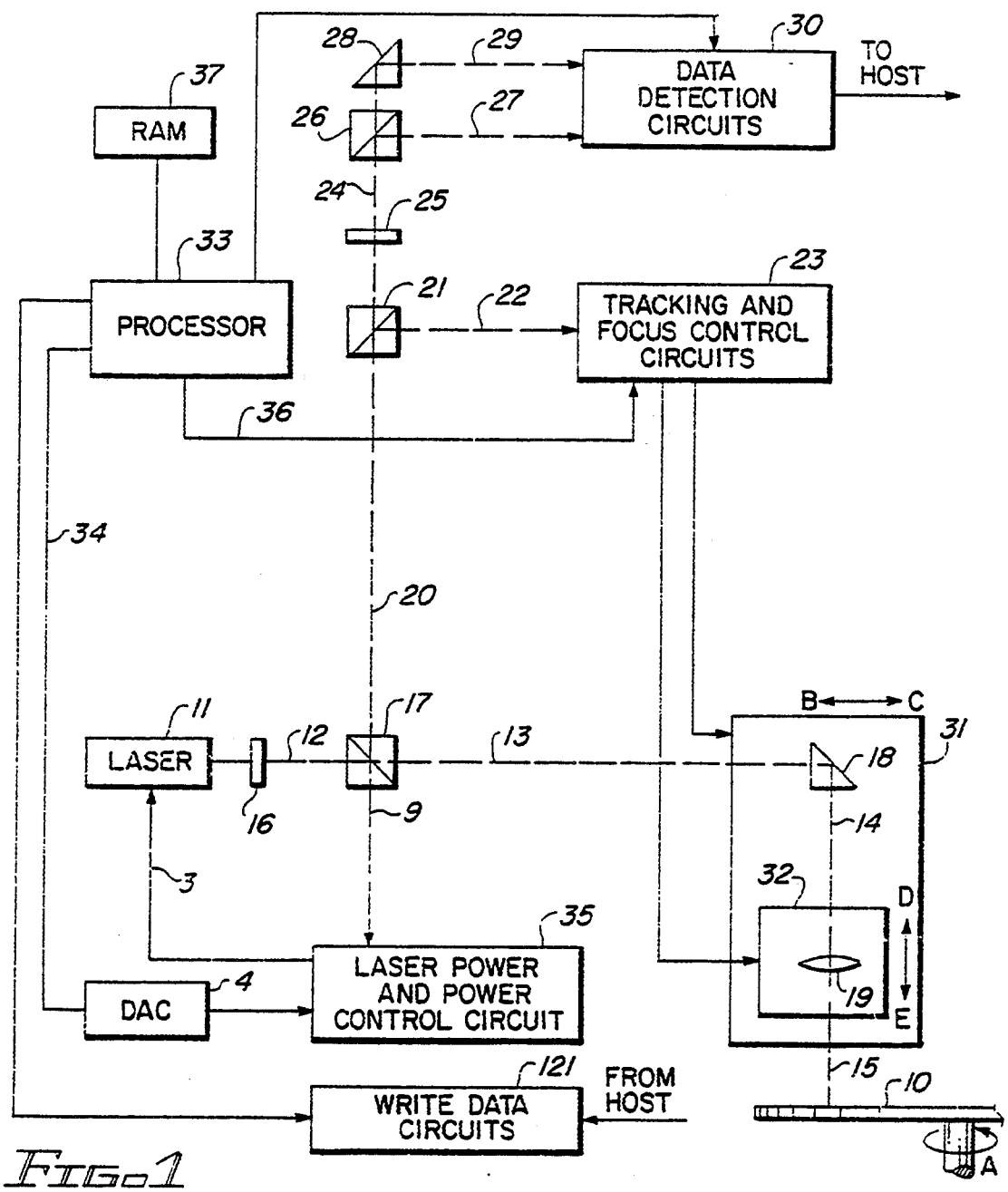
FIG. 1 is an optical data storage device with a control system according to the instant invention.

Referring now to the drawings, like numbers indicate like features, and a reference number appearing in more than one figure refers to the same element.

FIG. 1 is an embodiment of the optical data storage device of the present invention. An optical disk 10 is mounted for rotation in the direction A in an optical disk playback/recorder, the mechanical details of which are not shown. A laser 11 produces a light beam which travels over light paths 12-15 to the surface of the disk 10. The optical system which directs the light to the disk 10 includes collimating and circularizing elements 16, beam splitter 17, prism 18 and focusing lens 19. Light reflected from disk 10 passes over light paths 15, 14 and 13 to polarizing beam splitter 17, where the beam is reflected over light path 20 to beam splitter 21. A portion of the reflected beam is passed over light path 22 to tracking and focus control circuits 23 which include a photodetector arrangement. The remainder of the reflected light is passed over optical path 24 through quarter-wave plate 25 to beam splitter 26. In a reflected light beam, the orthogonal polarization vectors are defined as P polarization if the electric field is parallel to the plane of incidence and S polarization if the electric field is perpendicular to the plane of incidence. The P+S component of the reflected beam is passed over light path 27 to a photodetector within data detection circuit 30. The P−S component is reflected by prism 28 over light path 29 to another photodetector within data detection circuits 30. Detector circuit 30 determines the relative magnitude of the P+S and P−S components in order to detect the magnetic orientation of the optical media and produce an output data stream in accordance therewith.

Prism 18 and objective lens 19 are mounted within a movable carriage 31. Carriage 31 responds to the tracking portion of the control circuits 23 to move the carriage in either direction B or C in order to move the laser beam across the surface of disk 10 to a desired track. Objective focusing lens 19 is mounted within a carriage 32 for movement in directions D and E in response to the focus portion of control circuit 23. In that manner, the light beam produced by laser 11 is maintained in focus on the surface of optical disk 10.

A portion of light emitted by laser 11 is reflected by beam splitter 17 over light path 9 to a photodetector within laser power control circuit 35. In that manner, laser power control circuit 35 is enabled to monitor the light output from laser 11 to establish and maintain correct power levels by controlling the laser drive current.

A processor 33 together with random access memory (RAM) 37 is provided to control all aspects of the operation of the system. Control signals provided by processor 33 are passed over line 34 to digital-to-analog converter, DAC 4. DAC 4 supplies an analog signal to the laser power control circuit 35 for setting the beam intensity in accordance with the digital input. In that manner, laser 11 is set to produce the proper intensity for reading, writing or erasing. Write data circuits 121 receive an input data stream and provide modulation input to the laser power control circuit 35 during a write operation. Output from processor 33 over line 36 is provided to control the tracking and focus control circuits 23.

Figure 2:
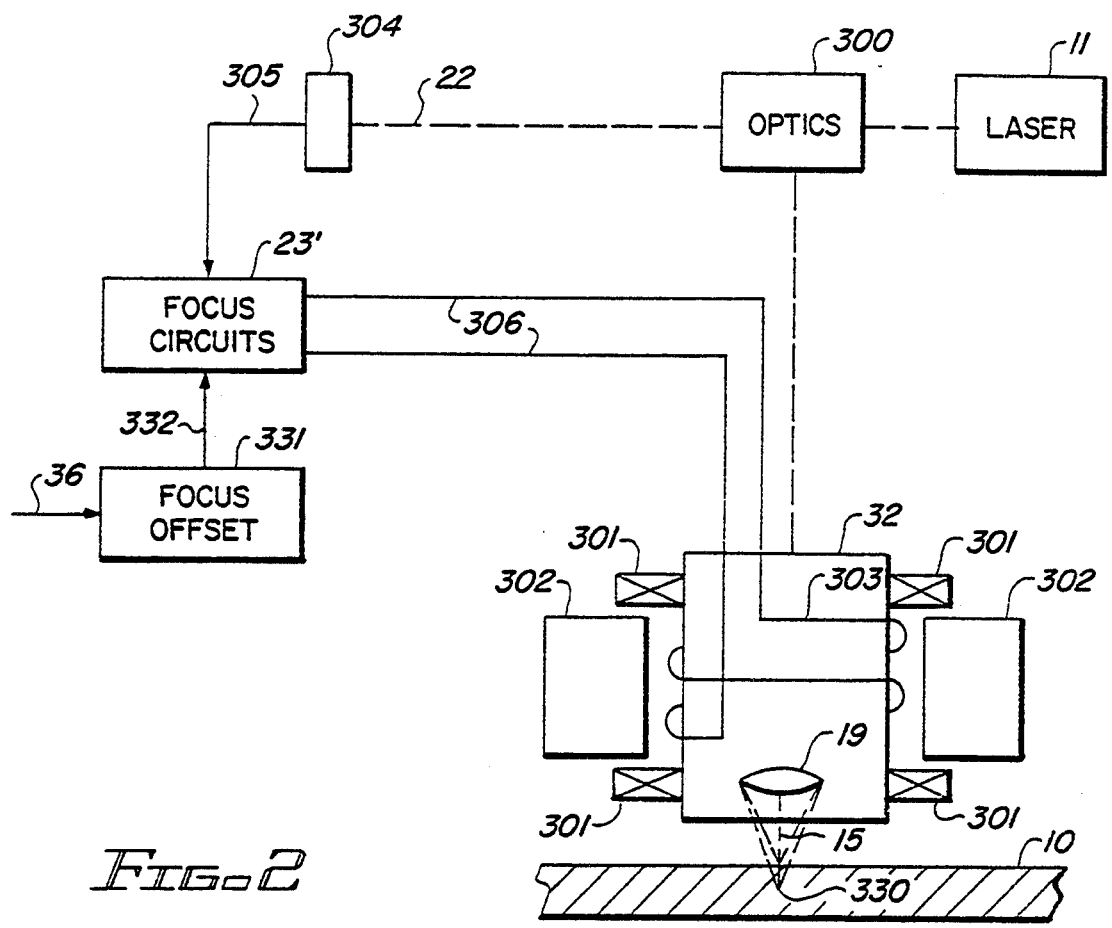
FIG. 2 shows a focussing system for use with the device of FIG. 1.

FIG. 2 shows a focusing circuit 23' for use with the device of FIG. 1. A more complete discussion of focussing control is found in U.S. Pat. No. 5,128,913, incorporated herein by reference. The objective lens 19 is carried by lens carriage 32 to provide focus for the beam produced by laser 11 over light path 15 onto the surface of disk 10. Optics 300 represents the various optical components along light path 12 to 15, shown in more detail in FIG. 1. A focusing coil 303 is mounted about the lens carriage 32 and preferably movable therewith. It generates magnetic fields which coact with stationary magnetic fields generated from permanent magnets 302 which are suitably mounted on a frame (not shown). A set of bearings slideably support lens carriage 32 for movement along the optical axis of objective lens 19.

Disk 10 reflects the beams supplied by laser 11 through objective lens 19 and the optics system 300. Optics 300 redirects the reflected light along path 22 to focus detector 304. Focus detector 304 supplies a focus error signal (FES) over electrical line 305 to the focus circuits 23'. Focus circuits 23' are coupled to coil 303 by signal lines 306 for supplying appropriate focus control signals which activate movement of lens carriage 32 toward or away from the disk 10.

Figure 3:
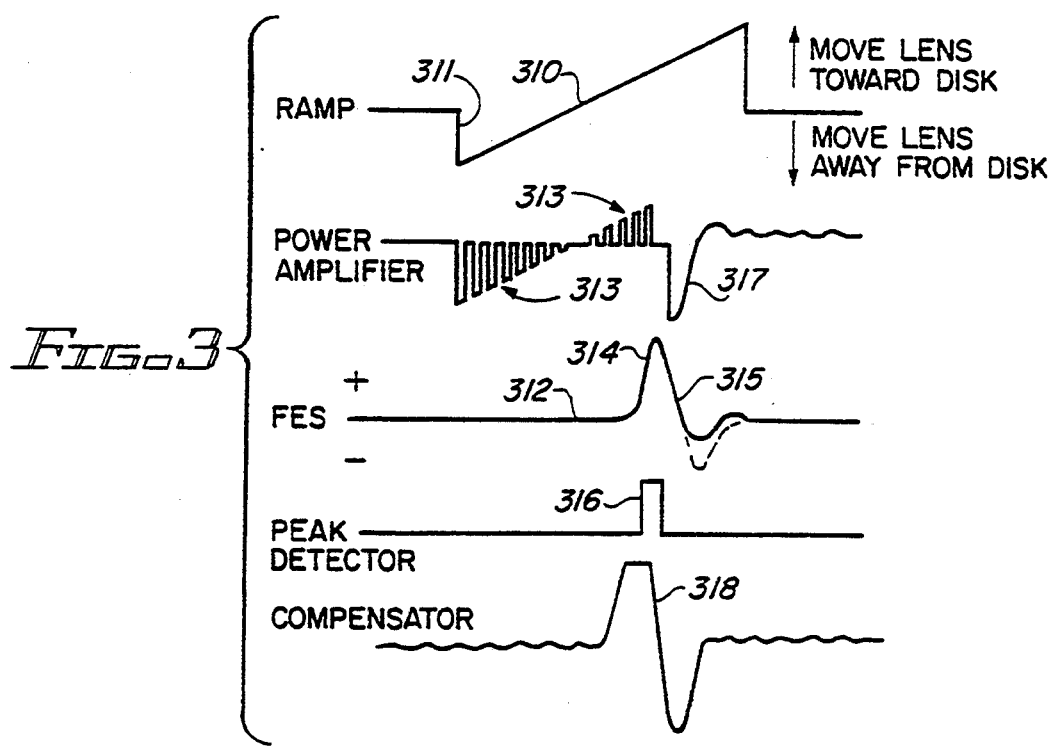
FIG. 3 is a set of idealized waveforms used to illustrate the operation of FIG. 2.

FIG. 3 illustrates an open-loop position control signal 310 in the shape of a ramp which is designed to move the objective lens 19 toward the disk 10 for acquiring focus of the laser 11 beam. Initially, at reverse step 311, lens 19 is moved by signal 310 to a most remote position, that is, furthest position away from disk 10. This represents an out-of-focus condition as indicated by the signal 312 portion of FES. Ramp 310 is modulated as represented by position control pulses 313. The position control pulses 313 momentarily and repeatedly urge the lens 19 to move closer to the in-focus condition. Lens 19 is allowed to coast between each successive pulse 313 thereby providing a soft control of the movement of lens 19. The focus error signal at 312 indicates an out-of-focus condition, while positive excursion 314 indicates an approach to the in focus position at point 315. The peak 314 is detected resulting in a peak-detected output signal 316. At this point, the pulses 313 are terminated and the lens is allowed to coast toward an in-focus condition. A stopping or reversing pulse 317 stops the lens 19 within the focus maintenance zone such that the focus maintenance servos maintain the focus of the lens. The focus control circuits include a compensator which provides a modification of control to the power amplifier as represented by numeral 318 in FIG. 3 in order to maintain focus.

To implement the instant invention, during the write process it is desired to slightly defocus the lens so that the focus point 330 is not directly on the surface of the reactive layers of disk 10 as shown in FIG. 2. To do that, the focus circuits are controlled from microprocessor 33 such that the lens is slightly moved to defocus from the reactive layers of the disk whenever a write operation is to commence and until the write operation is completed. Microprocessor 33 supplies a control signal over line 36 to enable focus offset circuit 331 to provide a focus offset signal on line 332 to slightly offset the control point in the focus circuits 23' whenever a write operation is to commence, and until it is completed. In that manner, the focus servo of focus circuits 23' establishes and maintains the focal point 330 at a position defocused relative to the surface of disk 10.

Figure 4:
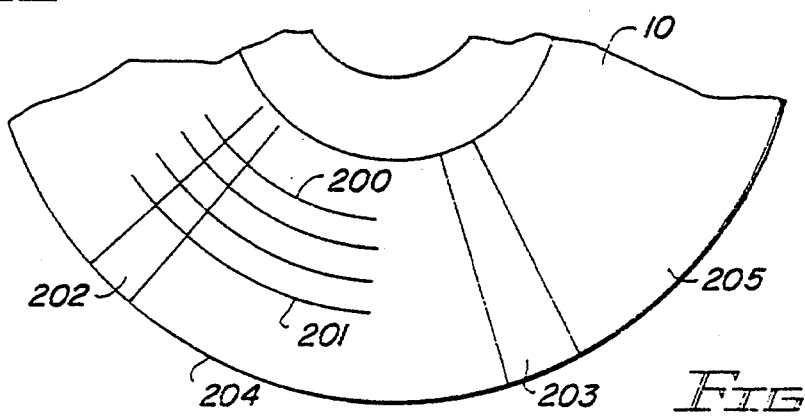
FIG. 4 is a schematic representation of sectors, tracks, sector headers, and user areas on a section of a typical optical disk for use with the apparatus of FIG. 1.

FIG. 4 is a schematic representation of a portion of the surface of disk 10, and shows various tracks 201 on the surface of the disk, together with sector header regions 202 and 203 which are situated between user areas 204 and 205. For an MO disk, the magneto-optic region, that is the erasable region, is the user area 204 and 205. Tracks may be concentric or, preferably, may be formed in a continuous spiral convolution. Sector header regions 202 and 203 are, at the current time, permanently inscribed with data identifying the particular track and sector, and with the sector mark. There are more complicated optical disk formats proposed which involve banded media to increase the capacity of the disk. With that type of format, the media is divided into annular bands. In each of these bands a frequency at which data is recorded is scaled according to the approximate diameter of each band so that the recording density is a constant at the inner-diameter of each band. In some banded formats, the headers are not radially aligned, as shown in FIG. 4. However, the inventive system herein does not depend upon the format of the disk, and FIG. 4 is provided solely as an aid to comprehension and not as a limiting schematic representation of tracks, sectors and headers.

Figure 5:
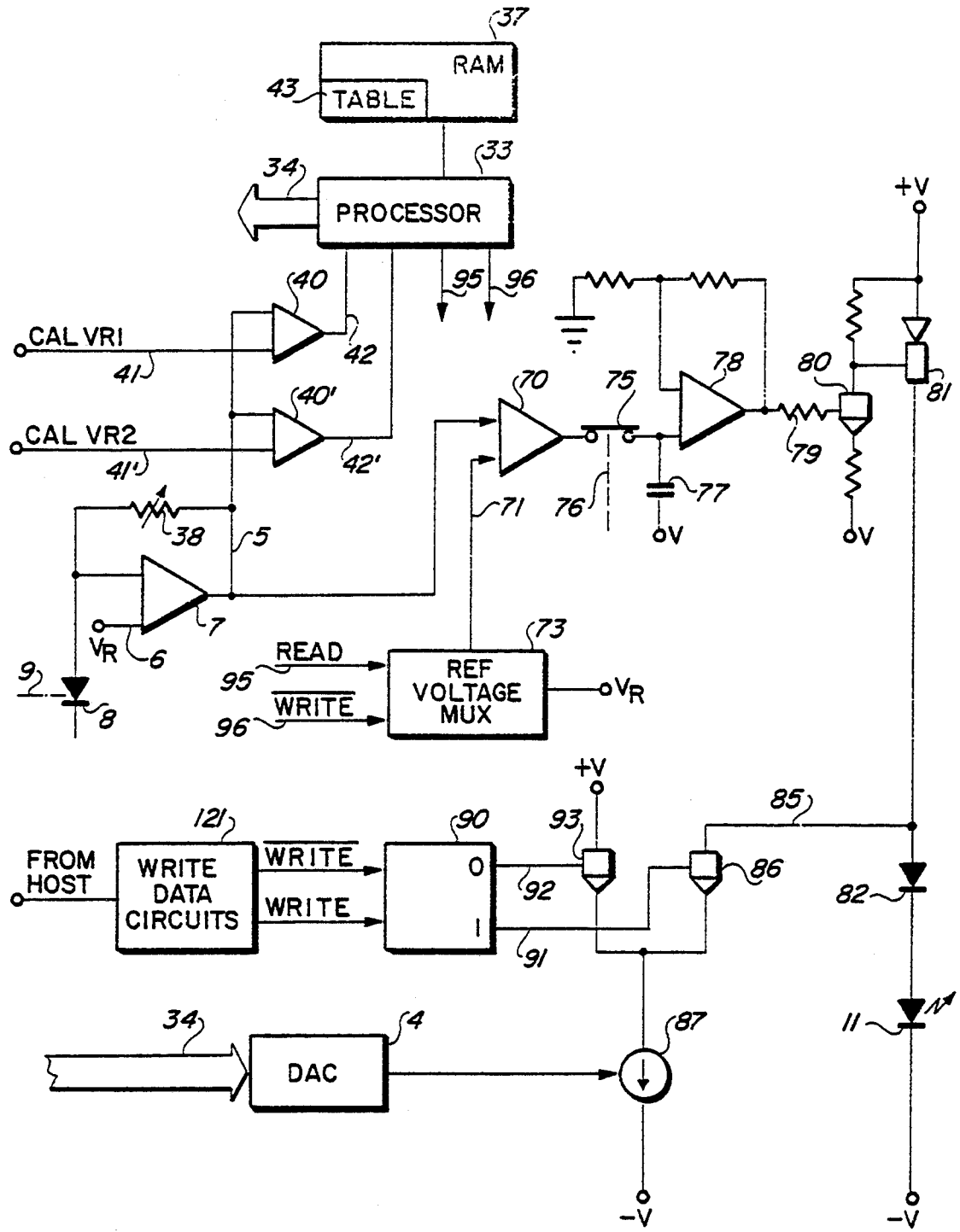
FIG. 5 shows a write calibration circuit for use in the system of FIG. 1.

FIG. 5 shows detailed circuits for the laser power control circuit 35. Radiation emitted by laser 11 is received by photodetector 8 over light path 9 to provide feedback for calibrating the DAC so that proper settings are ascertained. Current produced by photodetector 8 varies in amplitude in accordance with the intensity of the laser beam received over light path 9. The output current of photodetector 8 is provided to transimpedence amplifier 7 and compared with a reference value $V_R$ on line 6. The output of amplifier 7 is a signal on line 5 which is indicative of the output beam intensity of laser 11. Potentiometer 38 adjusts the gain of the transimpedence amplifier in order to calibrate the signal level on line 5.

During normal read and baseline write operations, the circuit responds to the signal level on line 5 to maintain the operation of laser 11 at predetermined intensity values. For example, the circuit will maintain a level of 2 milliwatts during a read operation and a level of 0.5 milliwatts during a baseline write operation.

The signal on line 5 is summed with the signal on line 71 to provide a voltage error output from amplifier 70 which is indicative of the difference between a desired laser power level of, for example, 2 milliwatts and the actual laser output power level. The error signal is passed through control switch 75 which is closed during a read or baseline write operation via a signal from microprocessor 33 received over line 76. Capacitor 77 smooths the signal received from amplifier 70 and acts as a sample and hold capacitor when switch 75 is open. A second amplifier 78 buffers and amplifies the error signal for passing it through resistor 79 to a controlling transistor 80. Transistor 80 acts as a current control for a second transistor 81 which has its base connected to the collector of transistor 80. Transistor 81 supplies a drive current which flows through voltage shifting diode 82 and thence to laser diode 11.

The drive current value flowing through transistor 81 is the total current for the mode involved. For the read mode, the current flowing through transistor 81 is the current needed to produce 2 milliwatts. For the recording mode, transistor 81 provides the current to produce the peak write power, for example, 15 milliwatts. Between the writing impulses at 15 milliwatts, the laser 11 is switched to the baseline write level. At the baseline write level, the current in transistor 81 is partially diverted through a transistor 86 to current sink 87. The current flow through sink 87 is controlled by DAC 4.

To drive laser 11 to provide a write pulse, a digital numerical value is supplied over line 34 from microprocessor 33 to DAC 4 to establish the correct current flow to produce a 15 milliwatt write pulse. When changing the setting of DAC 4, switch 75 is closed, transistor 86 is conducting, and after DAC 4 is changed, the control circuit is allowed to regain equilibrium at the baseline write level. Thus, the current in current sink 87 is established as the current needed to produce the write power above the baseline. Write pulses are produced in accordance with data received from a host and processed by write data circuits A write data signal is provided from a host to write data circuits 121 and thence to flip-flop switch 90 which provides a signal over line 91 to make transistor 86 nonconductive. As a result current from transistor 81 is forced to flow through laser diode 11. Simultaneously the line 92 from flip-flop 90 switches transistor 93 to current conduction for replacing the current at current sink 87 previously supplied through transistor 86. When a baseline write signal, that is a not-write signal, is supplied to flip-flop 90, the current conduction of transistors 86 and 93 is reversed for diverting current from transistor 81 to reduce the emission of radiation or light from laser 11.

To obtain the correct read level of, for example, 2 milliwatts, switch 75 is closed and control line 95 from microprocessor 33 enables the reference voltage circuit 73 to provide an output on line 71 that establishes the target value for the control loop to the read level. The control loop then servo's the current from transistor 81 to obtain the read power levels. To obtain the correct baseline write level, control line 96 switches the reference voltage on line 71 to establish a target for the control loop to the baseline power level, for example, 0.5 mW. The control loop again servos the current from transistor 81 to obtain the proper laser power level. During recording or erasing modes, switch 75 is kept open so that the control loop is not activated. The control loop is activated during a read or when establishing a baseline write power level.

In order to provide the correct numerical information over line 34 to establish the desired control points for the various levels of erase and write laser intensity, the laser must be calibrated. Complete calibration techniques are described in U.S. Patent Applications Ser. Nos. 07/555,952 and 07/757,748, both of which are incorporated herein by reference. In calibrating laser 11, microprocessor 33 continuously increases the numerical value over cable 34 to thereby cause DAC 4 to actuate laser 11 to ever increasing power levels for increasing output light intensities. This repetitive step-by-step increasing continues until a first analog comparator 40 receives the line 5 signal at a voltage level which matches a calibration level CAL VR1. CAL VR1 is a voltage level corresponding to a first predetermined laser power level $P_1$ which is a desired minimal laser intensity level. During the period when laser power is being steadily increased to the level $P_1$, comparator 40 supplies an inactive signal over line 42 to microprocessor 33. When laser 11 emits a light beam producing a signal on line 5 that is equal to or greater than the minimal value CAL VR1, comparator 40 will supply an active signal over line 42 to microprocessor 33. Microprocessor 33 thereupon stores the DAC 4 input value in a Table 43, located in RAM 37 to indicate that DAC value which produces the power level $P_1$.

The repetitive step-by-step increasing of the DAC value commences again and continues until comparator 40' which is structured in the same way as comparator 40 detects a signal on line 5 that is greater in amplitude than the reference signal CAL VR2 on line 41'. CAL VR2 represents a maximum power level $P_2$ of the light intensity of laser 11. Comparator 40', when sensing the line 5 signal less than the reference signal, supplies an inactive signal over line 42' to microprocessor 33. As soon as comparator 40' senses that the signal on line 5 exceeds the reference signal CAL VR2, an active signal is supplied over line 42' to microprocessor 33 whereupon the value in DAC 4 is stored in Table 43.

Laser power to drive current curve is a linear curve over the region chosen in calibrating laser 11, that is, a linear curve between the power level $P_1$ and the power level $P_2$. As a consequence of the linearity, the microprocessor easily calculates the intensity level variation per DAC count and is thereby enabled to establish a DAC level for producing write pulses, 15 milliwatts in this example, and a level for producing erase power.

The calibration of laser 11 normally occurs with the objective lens moved to bring the laser beam into focus at the surface of optical media 10. However, in the instant invention, it is desired to write the disk 10 with the objective lens slightly out of focus. In that manner, the instability of laser 11 is significantly decreased since the feedback of reflected light is significantly decreased at an out-of-focus condition. However, in order to record data on the surface of optical disk 10, the correct power level must be maintained. That power level is decreased when the lens is out of focus. Consequently, it is necessary to calibrate the DAC 4 with the lens moved to the desired out-of-focus condition in order to produce a curve for enabling the processor 33 to calculate that DAC level needed to produce write power of 15 milliwatts. Therefore, in the operation of this invention, the procedure described above is performed at an out-of-focus condition, as well as for an in-focus condition, so that the microprocessor 33 can establish a DAC value to provide the desired write power at the surface of optical disk 10.

PRIOR ART

U.S. Pat. No. 4,639,907 relates to MO recording apparatus in which the erase signal is purposely defocused when irradiating the MO medium. The object is to avoid causing a crystallization of the MO material during the erase operation.

U.S. Pat. No. 4,949,329 also relates to the erasing process and calls for adjusting the duty cycle and laser power as well as providing a focus offset.

While the invention has been shown and described with reference to particular embodiments, other embodiments may serve equally well. For example, adjustments to the wavelength of radiation can produce the needed focus offset during the write operation and it should be understood that various other changes in form and details may be made by those of skill in the art without departing from the spirit and scope of the invention.

What is claimed is:

1. A method of operating apparatus for recording data on erasable optical media comprising the steps of:
    producing a light beam from a laser;
    providing an optical system including focusing means for coupling said light beam to said media;
    providing focus control circuits to establish a control point for in-focus condition and for maintaining said in-focus condition; and
    providing offset means to establish an out-of-focus condition during a data recording operation to reduce the effect of optical feedback on the power level stability of said laser during said data recording operation.

2. The method of claim 1 further including the steps of:
    providing laser power control means connected to said laser for driving said laser at a drive current level to produce a level of recording power at a surface of said media;
    providing a calibration means connected to said laser power control means for establishing the drive current level to produce said level of recording power at said media at said in-focus condition for a recording operation; and
    providing control means for enabling the establishment of said defocused condition so that said calibration means can establish the drive current needed to produce said level of recording power at said media at said defocused condition.

3. Apparatus for recording data on erasable optical media comprising
    a laser for producing a light beam;
    focus control circuits including photodetecting elements;
    an optical system for coupling said light to the surface of said optical media and for coupling light reflected from said media to said photodetecting elements;
    focusing means within said optical system connected to said focus control circuits for focusing said light beam on said media;
    offset means connected to said focus control circuits for establishing a control point that produces a slightly defocused condition at said surface of said optical media;
    laser power control circuit means connected to said laser for causing said laser to produce said light beam at an intensity level for recording data on said optical media;
    control means connected to said power control circuit means for setting said laser power control circuit means to establish said intensity level at the commencement of a data recording operation and for maintaining said intensity level until said recording operation is complete, said control means also connected to said offset means for enabling said offset means to establish said defocused condition at the commencement of said recording operation and for maintaining said defocused condition until said recording operation is complete;
    whereby optical feedback from said surface to said laser is reduced due to said defocused condition thereby enabling enhanced recording pulse-to-recording pulse repeatability during said recording operation.

4. The apparatus of claim 3 wherein said focussing means includes a lens carried by a lens carriage mounted within said apparatus for moving said lens toward and away from the surface of said media to thereby establish said slightly defocussed condition.

5. The apparatus of claim 3 further including
    calibration means connected to said laser power control means for establishing the drive current to produce recording power level at said media at said in-focus condition; and
    said control means for enabling the establishment of said slightly defocused condition during a calibration operation for calibrating said laser power control means to produce said recording power level at said out-of-focus condition.

6. The apparatus of claim 5 wherein said calibration means includes a power sensing photodetector and a digital-to-analog converter (DAC), said DAC connected to said control means, said control means for step-by-step increasing the output of said DAC to step-by-step increase said drive current to thereby relate drive current levels to sensed power levels.

7. The apparatus of claim 6 wherein said focussing means includes a lens carried by a lens carriage mounted within said apparatus for moving said lens toward and away from the surface of said media to thereby establish said slightly defocused condition.

* * * * *